Patented Aug. 24, 1954

2,687,369

UNITED STATES PATENT OFFICE 2,687,369

PREPARATION OF DECARBOXYLASE

Lucile R. Hac, Woodland, Calif., assignor to International Minerals & Chemical Corporation, a corporation of New York No Drawing. Application June 7, 1950, Serial No. 166,767

8 Claims. (Cl. 195—67)

This invention relates to decarboxylating enzymes and more particularly to a process for preparing a highly active enzyme, L-glutamic acid decarboxylase.

An amino acid decarboxylase removes a carboxyl group from the molecule of an amino acid with the subsequent formation of carbon dioxide and the corresponding amine. For example, the glutamic acid decarboxylase, which is widely associated with certain microorganisms, quantitatively liberates one mole of carbon dioxide from a mole of glutamic acid and yields gamma aminobutyric acid. The L-glutamic acid decarboxylase can be used in the quantitative determination of L-glutamic acid, and the quantity of L-glutamic acid is determined by measuring the amount of carbon dioxide liberated. Thus, it is desirable to obtain the enzyme in a pure and highly active form.

The L-glytamic acid decarboxylase is believed to be formed within certain bacterial cells in response to certain well defined conditions of growth. Many organisms possess decarboxylases for several amino acids while other strains possess decarboxylase specific for only one amino acid and are substantially devoid of the decarboxylases of the other amino acids. When the decarboxylase which is effective for a particular amino acid is to be used in the quantitative analysis of that amino acid, it is best, if possible, to select a strain of organism which yields an enzyme specific for that particular amino acid. If the decarboxylase produced by an organism possesses activity for other amino acids, the organism is suitable if the activity for these other amino acids may be destroyed without destroying the activity for the amino acid to be determined. For example, the organism *Escherichia coli*, American type culture 4157, contains only the lysine decarboxylase in addition to that of L-glutamic acid. This strain is suited for the production of pure L-glutamic acid decarboxylase because the lysine decarboxylase present in the organisms is destroyed during the drying process.

The activity of the decarboxylase can be determined by any suitable procedure for accurately measuring the carbon dioxide evolved under standard conditions. Activities are expressed as $Q_{CO_2}$ which is defined as the microliters of carbon dioxide liberated from substrate at 28° C. and at the optimum pH (in this case 5.0) per hour per milligram dry weight of organism.

The Warburg apparatus has been used extensively for these measurements [Gale, E. F., Biochem. J., 38, 242 (1944), and Schales D. and Schales S. S., Arch. Biochem. II, 445 (1946)], but any manometric or titrimetric method suitable for accurate measurement of the carbon dioxide evolved can be used.

The published procedure for the preparation of the L-glutamic acid decarboxylase from *Escherichia coli*, strain 4157, is that of W. W. Umbreit and I. C. Gunsalus, Journal Biol. Chem. 159, 332 (1945). They prepared a decarboxylase as follows: 10 liters of medium composed of 1.0% pepticase, 0.1% yeast extract, 0.25% dibasic potassium phosphate, and 1.0% cerelose were inoculated with 40 ml. of an 8 hour culture of *Escherichia coli*, strain 4157, and incubated at 25° C. The culture was allowed to incubate 39 hours. Then the grown organisms were harvested, washed and dried. The resulting dried organisms possessed only the glutamic acid decarboxylase. When tested at a pH of 5.0 the $Q_{CO_2}$ of the L-glutamic acid decarboxylase was 43.5. This activity is very low for practical and commercial purposes.

It is an object of the present invention to prepare a L-glutamic acid decarboxylase of high activity.

It is a further object of the invention to prepare a L-glutamic acid decarboxylase by a method in which the conditions are so controlled that a maximum amount of high potency enzyme is obtained.

Other objects will become apparent upon a clearer understanding of the invention as hereinafter described.

It has been discovered that a glutamic acid decarboxylase of very high potency is prepared in high yield by growing the organism *Escherichia coli*, strain 4157, with the following variations from the conditions conventionally employed: omitting the glucose from the culture medium during the major portion of the incubation period, enriching the culture medium with an additional amount of dibasic potassium phosphate, adding monosodium glutamate, glucose, and additional enzymehydrolyzed casein to the inoculated incubating medium just a few hours prior to harvest. The culture medium is incubated at a temperature of between about 30° and about 45° C., preferably between about 38° and about 40° C.

In one embodiment of the instant novel process the L-glutamic acid decarboxylase is prepared by inoculating a sterile aqueous medium containing yeast extract, casein hydrolysate, and dibasic potassium phosphate with *Escherichia coli*, strain 4157, and incubating the same for several hours at a slightly superatmospheric temperature, The major organism growth occurs during this incubation stage. Sterile aqueous solutions of the following are then added to the incubated culture medium: one containing glucose, one containing monosodium glutamate, and one containing casein hydrolysate. Incubation is then continued a few additional hours. The decarboxylase is recovered by separating the grown organisms from the culture medium. Other strains of *Escherichia coli* which possess the decarboxylase of glutamic acid, and which are substantially devoid of the decarboxylases of other amino acids, or strains yielding grown organisms from which the decarboxylase of other amino acids may be removed without destroying the decarboxylase of glutamic acid, may be employed in the practice of the instant novel process. *Escherichia coli*, strain 4157, is the preferred organism.

In the preparation of a large amount of bacterial growth it is preferable to prepare an inoculum rather than to inoculate an entire batch of medium with *Escherichia coli*. The culture is added to a smaller portion of medium, to which the sterile solution containing glucose has been added, and this portion is incubated for between about 8 and about 12 hours. This inoculum is then added to the larger batch of the original medium. This inoculated medium is then incubated for between about 18 and about 20 hours, although a shorter or longer period of incubation may be used if desired. After this period of incubation monosodium glutamate, glucose, and casein hydrolysate are added to the medium which is then incubated for a few additional hours, for example between about 2 and about 4 hours.

Increasing the temperature of incubation above atmospheric temperatures, which are conventionally employed, to between about 30° and about 45° C. contributes to the production of a glutamic acid enzyme of increased activity. In the preferred embodiment a temperature of between about 38° and about 40° C. is employed during the incubation period.

There is a marked increase in the activity of the glutamic acid decarboxylase when glucose is omitted from the basal culture medium during the major portion of the growth period. In practicing the instant process the inclusion of between about 1.0% and about 2.0%, preferably about 1.0% by weight of glucose in the inoculum, but the omission of it from the culture medium, except during the last few hours of incubation, has been found to be responsible for a substantial increase in the activity of the glutamic acid decarboxylase which is produced. Between about 0.5% and about 2.0%, preferably between about 1.0% and about 1.5% by weight of glucose, is added to the incubated medium a few hours prior to harvest. In one embodiment of the process glucose is added to the medium between about 2 and about 4 hours prior to harvest. It is preferably added about 3 hours prior to harvest.

The addition of monosodium glutamate to the culture medium before the final inoculation period is undertaken is also a condition, not previously employed, and one which favors the development of a glutamic acid decarboxylase of high potency. In practicing the process, the monosodium glutamate is added to the culture medium between about 2 and about 4 hours prior to harvest. Between about 0.1% and about 2.0%, preferably about 1.0%, by weight of monosodium glutamate is included in the medium during the last 3 hours of incubation.

Another factor which is responsible for significant improvement in activity and yield is the addition to the medium of a larger amount of phosphate than heretofore conventionally employed. The addition of increased amounts of dibasic potassium phosphate greatly increases both the amount and the quality of the decarboxylase produced. Between about 1.5% and about 2.0% by weight of dibasic potassium phosphate is preferably used; however amounts of between about 0.5% and about 2.5% by weight of dibasic potassium phosphate cause an increase in activity and yield of the decarboxylase produced. Previously, the inoculum has been produced by incubating between about 9 and about 12 hours. In the practice of the instant process a 9 hour incubation in preparing the inoculum is considered optimum, although this time range is not considered a critical feature. Other time ranges outside of the above limits may be used.

Increased amounts of enzyme-hydrolyzed casein are also added to the medium. Between about 1.0% and about 2.0% by weight is included in the original basal medium, and in addition a few hours prior to harvest, between about 0.5% and about 0.7% by weight of casein hydrolysate is added to the incubated medium.

Between about 0.2% and about 2.0% by weight of yeast extract is included in the basal medium, however between about 1.0% and about 1.5% by weight is preferable.

In an embodiment of the instant novel process a sterile aqueous medium containing between about 1.0% and about 1.5% by weight of yeast extract, between about 1.0% and about 1.5% by weight of enzyme-hydrolyzed casein, and between about 1.5% and about 2.0% by weight of dibasic potassium phosphate is prepared. All percents are by weight based on total weight of the medium. A small portion (10%) of this medium is removed to a separate vessel for use in preparing an inoculum. The organisms of the type heretofore described from three yeast extract agar slants obtained after 16 hours growth are suspended in a sterile saline solution and added to the aforesaid inoculum portion along with a sterile solution containing sufficient glucose to obtain between about 1.0% and about 2.0% by weight of glucose in the inoculum. The whole is incubated for about 9 hours at between about 30° and about 45° C. The resultant inoculum is added to the remaining and major portion of the sterile medium which is then incubated for between about 18 and about 20 hours at between about 30° and about 45° C. After this period of incubation the following are added to the incubated medium: monosodium glutamate in sufficient amount to obtain between about 0.1% and 2.0% in the medium, glucose in sufficient amount to obtain between about 1.0% and about 1.5% in the medium, and between about 0.5% and about 0.7% by weight of enzyme-hydrolyzed casein. These are introduced in sterile aqueous solutions. The medium is then incubated for about 3 additional hours, and decarboxylase is recovered from the medium by centrifugation in a Sharples super centrifuge or other suitable separation device.

In order to illustrate the invention but with no intention of being limited thereto, the following example is set forth.

*Example*

An aqueous medium was prepared which contained about 1.0% by weight of enzyme-hydrolyzed casein, about 1.0% by weight of yeast extract, and about 1.5% by weight of dibasic potassium phosphate. These ingredients were dissolved in about 2 liters of water by warming, and the resultant solution was then filtered. The solution was diluted to about 10 liters with distilled water. The medium was sterilized by autoclaving at about 15 pounds steam pressure for about 20 minutes and then rapidly cooled. About 900 ml. of this solution was used to prepare the inoculum and was sterilized in a separate flask. After cooling, a sterile solution containing about 9 grams of glucose in about 30 ml. of distilled water was added to the 900 ml. portion, and the resultant solution was inoculated with the growth from three yeast extract agar slants of *Escherichia coli*, strain 4157, which are suspended in about 15 ml. of sterile saline solution. This portion was incubated for about 9 hours at about 40° C. This inoculum was then added to the remaining portion of the sterile aqueous medium and was incubated at 40° C. for about 18 hours. At the end of this incubation period a sterile solution containing about 100 grams of glucose, one containing about 50 grams of enzyme-hydrolyzed casein, and one containing about 115 grams of monosodium glutamate were added. Incubation was continued for about 3 hours. The grown organisms were then separated from the medium in a Sharples super centrifuge. The organisms were washed once with saline solution and then taken up in distilled water. The suspension was poured into cold acetone which was vigorously agitated. The volume of acetone was at least about ten times the volume of the cell suspension. After the organisms flocculated, they were filtered and washed with cold acetone, then with cold ether. The organisms were then dried in a vacuum desiccator over sulfuric acid and then in vacuum over anhydrous calcium sulfate. Using the Warburg technique, the $Q_{CO_2}$ of the decarboxylase produced was 1125 as compared with 43.5 for decarboxylase prepared by heretofore known methods.

The decarboxylase is specific for L-glutamic acid and can be used to determine the amount of L-glutamic acid in an aqueous solution in which there are no impurities or in solutions containing impurities, such as Steffen's filtrate, protein hydrolysates, etc.

Having thus fully described and illustrated my invention, what is desired to be secured by Letters Patent is:

1. A process of preparing highly active glutamic acid decarboxylase which comprises inoculating a sterile aqueous medium containing essentially yeast extract, casein hydrolysate, and dibasic potassium phosphate with *Escherichia coli*, incubating the same for several hours at a slightly superatmospheric temperature, adding to the incubated medium sterile glucose, casein hydrolysate, and monosodium glutamate, then continuing the incubation for a few additional hours, and recovering the decarboxylase by separating the organisms from the aqueous medium.

2. The process of claim 1 wherein incubation is carried out at a temperature of between about 30° and about 45° C. and in which *Escherichia coli*, strain 4157, is used.

3. A process of preparing highly active glutamic acid decarboxylase which comprises preparing a sterile aqueous medium containing essentially yeast extract, casein hydrolysate, and dibasic potassium phosphate, removing a portion of this medium for use in preparing an inoculum, adding a small amount of glucose to the portion from which the inoculum is to be prepared, introducing *Escherichia coli* into the aforesaid portion, incubating the same for several hours at slightly superatmospheric temperature, adding the resultant inoculum to the remainder of the sterile medium and incubating at slightly superatmospheric temperature for several hours, adding glucose, casein hydrolysate, and monosodium glutamate to the incubated medium, then continuing the incubation for a few additional hours, and recovering the decarboxylase by separating the organisms from the aqueous medium.

4. The process of claim 3 wherein incubation is carried out at a temperature of between about 30° and about 45° C. and in which *Escherichia coli*, strain 4157, is used.

5. A process of preparing highly active glutamic acid decarboxylase which comprises preparing a sterile aqueous medium containing essentially between about 0.2% and about 2.0% by weight of yeast extract, between about 1.0% and about 2.0% by weight of enzyme-hydrolyzed casein and between about 0.5% and about 2.5% by weight of dibasic potassium phosphate, removing a portion of this medium for use in preparing an inoculum, adding between about 1.0% and about 2.0% by weight of glucose to the portion from which the inoculum is to be prepared, introducing *Escherichia coli*, strain 4157, into the aforesaid portion, incubating the same for several hours at a temperature between about 30° and about 45° C., adding the resultant inoculum to the remainder of the sterile medium and incubating at between about 30° and about 45° C. for several hours, adding between about 0.5% and about 2.0% by weight of glucose, between about 0.5% and about 0.7% by weight of enzyme-hydrolyzed casein, and between about 0.1% and about 2.0% by weight of monosodium glutamate to the incubated medium, then continuing the incubation for a few additional hours, and recovering the decarboxylase from the medium.

6. A process of preparing highly active L-glutamic acid decarboxylase which comprises preparing a sterile aqueous medium containing essentially yeast extract, casein hydrolysate, and dibasic potassium phosphate, removing a portion of this medium for use in preparing an inoculum, adding a small amount of glucose to the portion from which the inoculum is to be prepared, introducing *Escherichia coli*, strain 4157, into the aforesaid portion, incubating the same for between about 8 and about 12 hours at between about 30° and about 45° C., adding the resultant inoculum to the sterile medium and incubating at between about 30° and about 45° C. for between about 18 and about 20 hours, adding glucose, casein hydrolysate, and monosodium glutamate to the incubated medium, then continuing the incubation for between about 2 and about 4 hours, and recovering the decarboxylase enzyme by separating the organisms from the aqueous medium.

7. A process for preparing highly active L-glutamic acid decorboxylase which comprises preparing a sterile aqueous medium containing essentially between about 0.2% and about 2.0% by weight of yeast extract, between about 1.0% and about 2.0% by weight of enzyme-hydrolyzed casein, and between about 0.5% and about 2.5% by weight of disbasic potassium phosphate, removing a portion of this medium for use in preparing an inoculum, adding a sterile aqueous solution containing sufficient glucose to obtain between about 1.0% and about 2.0% by weight of glucose in the inoculum portion, introducing *Escherichia coli*, strain 4157, into the aforesaid portion, incubating the same for between about 8 and about 12 hours at a temperature of between about 30° and about 45° C., adding the resultant inoculum to the sterile medium and incubating at between about 30° and about 45° C. for between about 18 and 20 hours, adding to the incubated medium sterile solutions of the following: one containing between about 5 and about 20 grams per liter of culture medium of glucose, one containing between about 5 and about 7 grams per liter of culture medium of enzyme-hydrolyzed casein, and one containing between about 1.0 and about 20 grams per liter of culture medium of monosodium glutamate, then further incubating the resultant mixture for between about 2 and about 4 hours, and separating the decorboxylase from the aqueous medium.

8. A process for preparing a highly active glutamic acid decarboxylase which comprises preparing a sterile aqueous medium containing essentially between about 1.0% and about 1.5% by weight of yeast extract, between about 1.0% and about 1.5% by weight of enzyme-hydroylzed casein, and between about 1.5% and about 2.0% by weight of disbasic potassium phosphate, removing a portion of this medium for use in preparing an inoculum, adding a sterile 1.0% aqueous solution containing sufficient glucose to obtain between about 1.0% and about 2.0% by weight of glucose in the portion from which the inoculum is to be prepared, introducing *Escherichia coli*, strain 4157, into the aforesaid portion, incubating the same for about 9 hours at a temperature between about 35° and about 45° C., adding the resultant inoculum to the sterile medium and incubating at between about 35° and about 45° C. for about 18 hours, adding to the incubated medium sterile solutions of the following: one containing between about 10 and about 15 grams per liter of culture medium of glucose, one containing between about 5 and about 7 grams per liter of culture medium of enzyme-hydrolyzed casein, and one containing between about 10 and about 15 grams per liter of culture medium of monosodium glutamate, then incubating the resultant mixture for about 3 hours additional, and separating the decorboxylase from the aqueous medium.

References Cited in the file of this patent

UNITED STATES PATENTS

| Number | Name | Date |
|---|---|---|
| 2,302,079 | Waldmann | Nov. 17, 1942 |

OTHER REFERENCES

Stephenson et al., Factors Influencing Bacterial Deamination, Biochemical J., 1937, vol. 31, pages 1316–1322. Published by Cambridge University Press.

Virtanen et al., Decarboxylation of Aspartic and Glutamic Acids, Nature, October 8, 1938, vol. 142, page 674. Published by MacMillan and Co., Ltd., London W. C. 2.

Kalnitsky et al., Active Enzyme Preparations From Bacteria, J. Bacteriology, June 1945, vol. 49, pages 595–602.

Gale, Advances in Enzymology, vol. 6 (1946), pages 4 to 14.